US011677582B2

(12) United States Patent
Buchanan et al.

(10) Patent No.: US 11,677,582 B2
(45) Date of Patent: Jun. 13, 2023

(54) DETECTING ANOMALIES ON A CONTROLLER AREA NETWORK BUS

(71) Applicant: Raytheon Company, Waltham, MA (US)

(72) Inventors: Amanda L. Buchanan, Greer, SC (US); David T. Lynge, Greenville, SC (US); David A. Kwietniewski, Greenville, SC (US)

(73) Assignee: Raytheon Company, Waltham, MA (US)

( * ) Notice: Subject to any disclaimer, the term of this patent is extended or adjusted under 35 U.S.C. 154(b) by 211 days.

(21) Appl. No.: 17/116,370

(22) Filed: Dec. 9, 2020

(65) Prior Publication Data
US 2022/0182260 A1 Jun. 9, 2022

(51) Int. Cl.
*H04L 12/40* (2006.01)

(52) U.S. Cl.
CPC .. *H04L 12/40104* (2013.01); *H04L 12/40019* (2013.01); *H04L 12/40026* (2013.01); *H04L 12/40078* (2013.01); *H04L 2012/40215* (2013.01)

(58) Field of Classification Search
CPC ........ H04L 12/40019; H04L 12/40026; H04L 12/40078; H04L 12/40104; H04L 2012/40215; H04L 2012/40071; H04L 63/1416; H04L 63/1425
See application file for complete search history.

(56) References Cited

U.S. PATENT DOCUMENTS

| 7,143,186 B2 | 11/2006 | Stewart et al. |
| 9,840,212 B2 | 12/2017 | Ben Noon et al. |
| 10,158,717 B2 | 12/2018 | Kishikawa et al. |
| 10,292,136 B2 | 5/2019 | Rubin et al. |
| 10,355,853 B1 | 7/2019 | Surmi et al. |
| 10,462,226 B2 | 10/2019 | Kishikawa et al. |
| 10,498,749 B2 | 12/2019 | Kupfer et al. |
| 10,502,572 B1 | 12/2019 | Surmi et al. |
| 10,625,694 B2 | 4/2020 | Ben Noon et al. |
| 10,686,815 B2 | 6/2020 | Ploucha et al. |

(Continued)

FOREIGN PATENT DOCUMENTS

| WO | WO-2013144962 A1 | 10/2013 |
| WO | WO-2022125625 A1 | 6/2022 |

OTHER PUBLICATIONS

"International Application Serial No. PCT/US2021/062353, International Search Report dated Feb. 25, 2022", 5 pgs.

(Continued)

*Primary Examiner* — Stephen J Clawson
(74) *Attorney, Agent, or Firm* — Schwegman Lundberg & Woessner, P.A.

(57) ABSTRACT

A process detects anomalies on a controller area network (CAN) bus. An arbitration field in a message on the CAN bus is analyzed, and a data field in the message on the CAN bus is inspected. The process further monitors a frequency of message identifiers that are transmitted across the CAN bus, and determines that an overall bus load crosses a threshold. The process then transmits an alert when the analyzing the arbitration field, the inspecting the data field, the monitoring the frequency, and the determining the overall bus load indicate that an anomaly has occurred on the CAN bus.

20 Claims, 3 Drawing Sheets

(56) References Cited

U.S. PATENT DOCUMENTS

| | | |
|---|---|---|
| 10,785,242 B1 | 9/2020 | Ladd |
| 10,824,720 B2 | 11/2020 | Ruvio et al. |
| 2002/0144156 A1* | 10/2002 | Copeland, III ..... H04L 63/0263 709/224 |
| 2009/0234971 A1 | 9/2009 | Jethanandani et al. |
| 2011/0093639 A1 | 4/2011 | Richards |
| 2011/0153103 A1* | 6/2011 | Brown .............. H02J 13/00016 340/657 |
| 2012/0150365 A1 | 6/2012 | Maxwell et al. |
| 2012/0254804 A1 | 10/2012 | Sheha et al. |
| 2013/0212422 A1* | 8/2013 | Bauer ................. H04L 67/1097 714/57 |
| 2015/0191135 A1 | 7/2015 | Ben Noon et al. |
| 2018/0227306 A1 | 8/2018 | Borkowicz |
| 2019/0385057 A1 | 12/2019 | Litichever et al. |
| 2019/0392142 A1 | 12/2019 | Harris et al. |

OTHER PUBLICATIONS

"International Application Serial No. PCT/US2021/062353, Written Opinion dated Feb. 25, 2022", 6 pgs.

Emad, Aliwa, et al., "Cyberattacks and Countermeasures for In-Vehicle Networks", arxiv.org, Cornell University Library, 201 Olin Library Cornell University Ithaca, NY 14853, (Apr. 22, 2020).

Froschle, Sibylle, et al., "Analyzing the Capabilities of the CAN Attacker", Advances in Biometrics: International Conference, ICB Seoul, Korea, (Aug. 12, 2017), 464-482.

"U.S. Appl. No. 16/008,610, Non Final Office Action dated Feb. 19, 2020".

"U.S. Appl. No. 16/008,610, Notice of Allowance dated May 20, 2020".

"U.S. Appl. No. 16/008,610, Response filed Mar. 19, 2020 to Non Final Office Action dated Feb. 19, 2020", 10 pgs.

U.S. Appl. No. 16/008,610, U.S. Pat. No. 10,785,242, filed Jun. 14, 2018, Intrusion Detection in Airborne Platform.

* cited by examiner

DETECTING ANOMALIES ON A CONTROLLER AREA NETWORK BUS

TECHNICAL FIELD

Embodiments described herein generally relate to detecting anomalies on a controller area network (CAN) bus.

BACKGROUND

Detecting anomalies on controller area network (CAN) bus can increase security and allow predictive maintenance. However, while several methods exist, none permit for the detection of a broad range of anomalies.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1A:
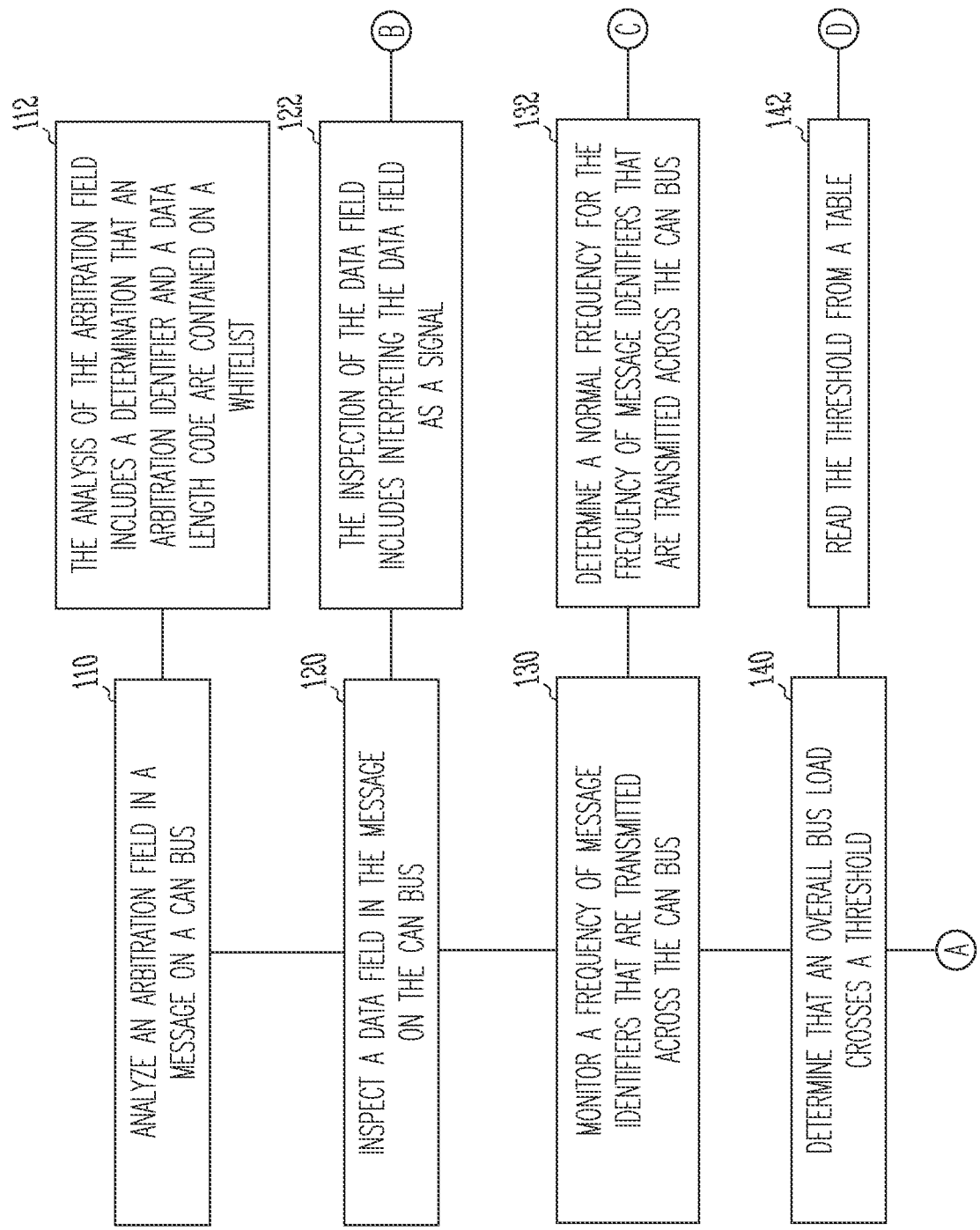
FIGS. 1A and 1B are a block diagram illustrating features and operations of a system and method to detect anomalies on a controller area network (CAN) bus.

In previous methods that attempted to determine anomalies on controller area networks (CAN) networks, it was required to install software on the devices on the CAN bus. Each device would then have to encrypt/decrypt its own messages. This caused problems since CAN networks in general do not have the processing power to handle this. However, an embodiment of the present disclosure is passive, it simply examines packets as the packets are transmitted through the network. An embodiment does not require that the CAN bus be modified, only that the software be added to the bus. Moreover, when CAN networks were developed, no emphasis was placed on security. Embodiments of this disclosure therefore address this issue. Further, embodiments of this disclosure do not have to be deployed at each endpoint of the network. Rather, the embodiments simply have to be positioned somewhere on the bus. Additionally, it is noted that the disclosed embodiments do not employ any machine learning like other approaches do. Virtually everything is known about the CAN bus, so the embodiments can be rules based and deterministic such that the same message will always result in the same determination. That is, the rules can be very strict.

As is known to those of skill in the art, a controller area network (CAN) bus is a communications bus protocol commonly used in commercial and military systems. However, the protocol for the CAN bus is outdated, and is lacking any built-in security. Since the CAN bus protocol is outdated, there is little incentive to putting significant resources into improving the security of the CAN bus. To address this situation, one or more embodiments disclosed herein provide an anomaly detection system that uses multiple means of detection that are specifically built to protect CAN bus networks. It is noted however that one or more embodiments and/or one or more techniques of these embodiments may be applicable to other types of networks.

One or more embodiments are designed to require very few computational resources so that the embodiments can run in real time on embedded systems. For example, an embodiment can be deployed as an operating system application for monitoring and/or passive protection, or on a field programmable gate array (FPGA) intellectual property (IP) core on the bus interface itself to inform a firewall for active protection and/or mitigation.

Consequently, in general, one or more embodiments of the present disclosure relate to an anomaly detection system that uses three approaches to check for anomalies in a controller area network (CAN) bus. These three approaches can be referred to as a signature-based approach, a frequency-based approach, and a bus load-based approach. The signature-based approach uses two methods to verify messages. First, it analyzes the arbitration/control field, and second it inspects the data field. The arbitration/control field of each message is first checked to ensure the arbitration identifier and data length code can be found in a whitelist. Then, various parts of the data field are interpreted as signals based on signal rules defined in a configuration file. Rules in the configuration file can either be whitelist rules to define what is allowed or blacklist rules to define what is not allowed. Each rule is viewed as a different allowed state for the machine. The state space is searched using a decision tree. For this approach, a tree is built using each allowed option for each field in the message. For each message, the tree can be traced from the top to the tip of a branch, and if all the field options in the message are found along the branch then the message is correct (i.e., not an anomaly). If the tip of a branch cannot be reached with the given field options, then the message is anomalous.

While the signature-based approach looks at the actual data that are sent over the bus, the heuristic-based frequency and bus load monitor approaches use features of the bus as a whole to monitor for anomalies.

The frequency-based approach employs a message-specific frequency monitor that tracks how often specific message identifiers are sent across the bus. In an embodiment, if a message is sent at more than twice the nominal frequency as defined in a specification file, then an alarm is generated. Other multiples of the nominal frequency can also be used. It is noted that messages appearing at a much higher rate than usual could result from a failing device or another device that is using the same identifier. In an embodiment, the message-specific frequency monitor takes at most one second to recognize an anomaly.

The bus load monitoring approach alerts a user when the overall bus load is above a certain percentage of the maximum value as specified in a rules table. For example, in an embodiment, an alert is transmitted when the overall bus load is 80% above the maximum value. The alert can also be based on different percentages. If the bus becomes saturated above this amount or some other amount, there is an increased chance that the system will fail to send lower-priority messages. This could indicate a potential Denial of Service (DOS) attack. The bus load monitor calculates the bus load over the previous second, or other relatively short time frame, so like the frequency-based approach, the bus load monitor approach takes at most one second to recognize a saturated bus.

In summary, the signature-based approach, the frequency-based approach, and the bus load-based approach are used in combination in real-time for a CAN bus. The variability in signature definition is combined with the use of both a whitelist and a blacklist for monitoring message frequency in correlation with bus loading in real time. The increased coverage that results from using the combination of the various approaches does not come at the cost of increased overhead. This can be run in real time to keep up with the bus and still be deployed on embedded systems with minimal resources.

Figure 1B:
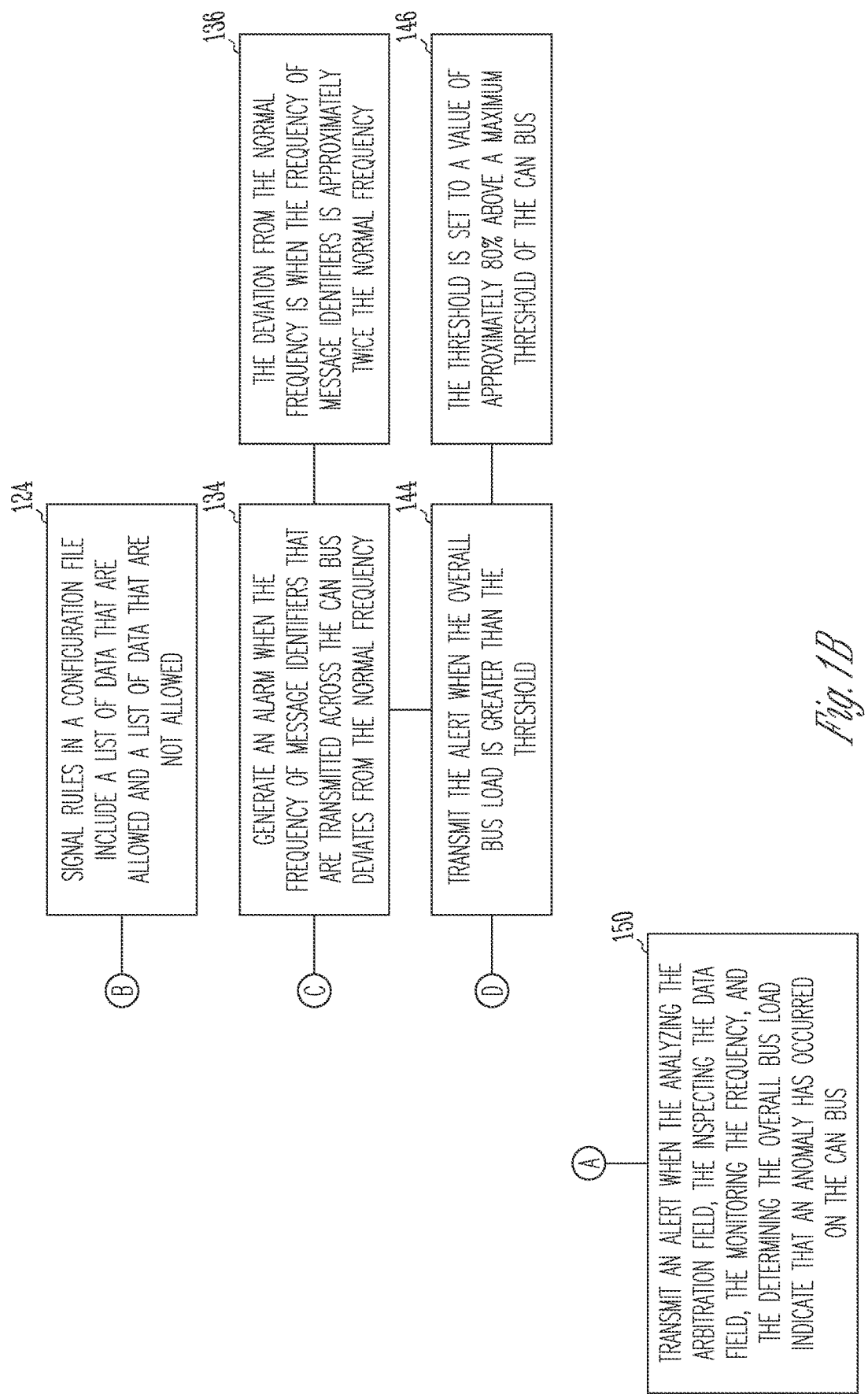

FIGS. 1A and 1B are a block diagram illustrating operations and features of an example system for detecting anomalies on a controller area network (CAN) bus. FIGS. 1A and 1B include a number of process blocks 110-146. Though arranged substantially serially in the example of FIGS. 1A and 1B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIGS. 1A and 1B, a process for detecting anomalies on a controller area network (CAN) bus at 110 analyzes an arbitration field in a message on the CAN bus, and at 120 inspects a data field in the message on the CAN bus. At 130, the process monitors a frequency of message identifiers that are transmitted across the CAN bus, and at 140, determines that an overall bus load crosses a threshold. Thereafter, at 150, the process transmits an alert when the analyzing the arbitration field, the inspecting the data field, the monitoring the frequency, and the determining the overall bus load indicate that an anomaly has occurred on the CAN bus.

Other features of the process for detecting anomalies on the CAN are as follows. As noted at 112, the analysis of the arbitration field can include a determination that an arbitration identifier and a data length code are contained on a whitelist. The presence of the arbitration identifier and data length code on the whitelist indicates that an anomaly has not occurred.

At 122, the inspection of the data field can include interpreting one or more parts of the data field as a signal. The interpretation of the data field as a signal can be based on one or more signal rules that are stored in a configuration file. In an embodiment, as indicated at 124, the signal rules in the configuration file can include a list of data that are allowed and a list of data that are not allowed.

At 132, a normal frequency for the frequency of message identifiers that are transmitted across the CAN bus is determined by reading a table. At 134, an alarm is generated when the frequency of message identifiers that are transmitted across the CAN bus deviates from the normal frequency. In a particular embodiment, as indicated at 136, the deviation from the normal frequency is when the frequency of message identifiers is approximately twice the normal frequency.

The determination that the overall bus load crosses a threshold is determined as follows. At 142, the threshold is read from a table, and at 144, the alert is transmitted when the overall bus load is greater than the threshold. In a particular example embodiment, as indicated at 146, the threshold is set to a value of approximately 80% above a maximum threshold of the CAN bus.

Figure 2:
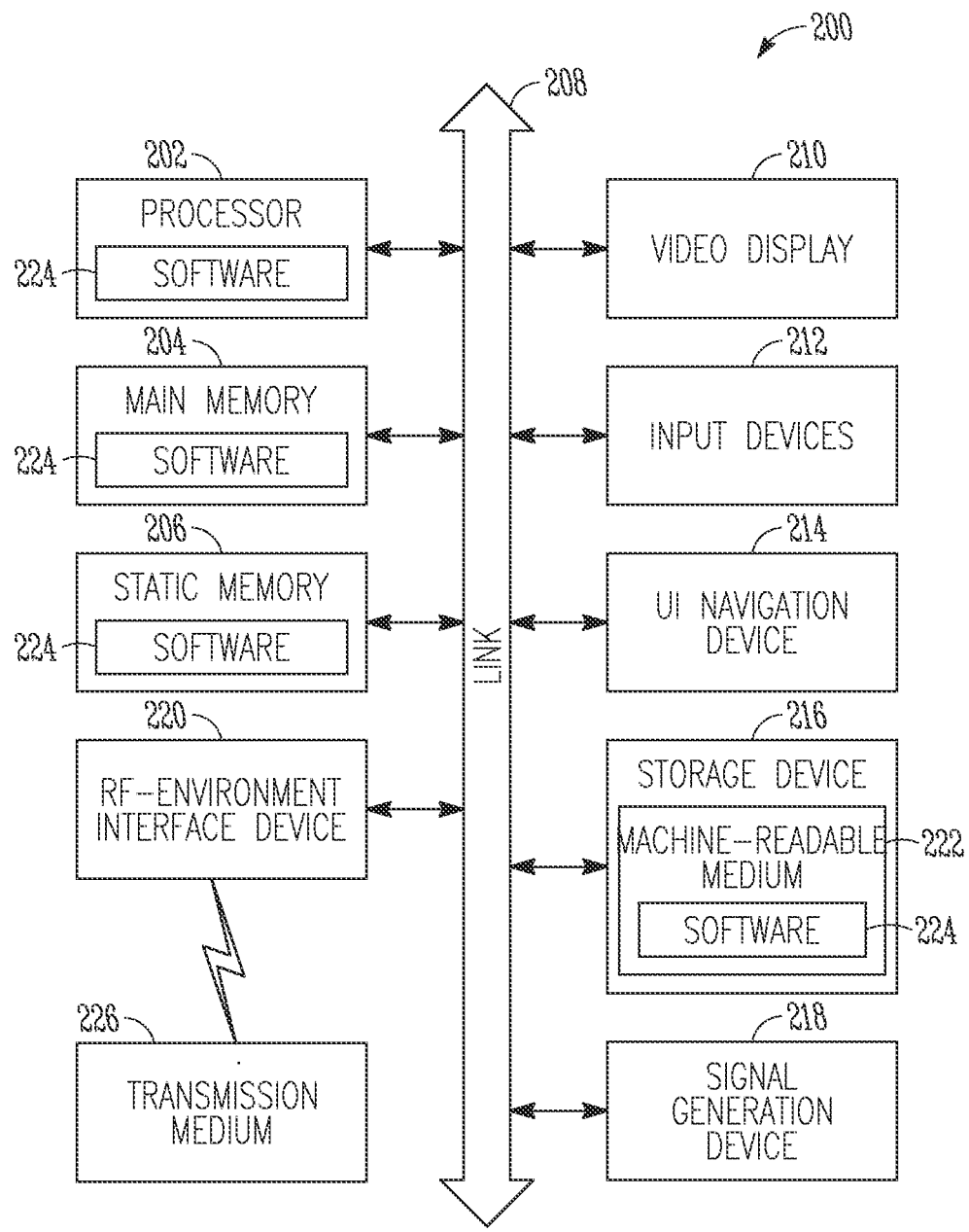
FIG. 2 is a block diagram of a computer system upon which one or more of the disclosed embodiments can execute.

FIG. 2 is a block diagram illustrating a computing and communications platform 200 in the example form of a general-purpose machine on which some or all the operations of FIGS. 1A and 1B may be carried out according to various embodiments. In certain embodiments, programming of the computing platform 200 according to one or more particular algorithms produces a special-purpose machine upon execution of that programming. In a networked deployment, the computing platform 200 may operate in the capacity of either a server or a client machine in server-client network environments, or it may act as a peer machine in peer-to-peer (or distributed) network environments.

Example computing platform 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The computing platform 200 may further include a video display unit 210, input devices 212 (e.g., a keyboard, camera, microphone), and a user interface (UI) navigation device 214 (e.g., mouse, touchscreen). The computing platform 200 may additionally include a storage device 216 (e.g., a drive unit), a signal generation device 218 (e.g., a speaker), and a RF-environment interface device (RFEID) 220.

The storage device 216 includes a non-transitory machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computing platform 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

RFEID 220 includes radio receiver circuitry, along with analog-to-digital conversion circuitry, and interface circuitry to communicate via link 208 according to various embodiments. Various form factors are contemplated for RFEID 220. For instance, RFEID may be in the form of a wideband radio receiver, or scanning radio receiver, that interfaces with processor 202 via link 208. In one example, link 208 includes a PCI Express (PCIe) bus, including a slot into which the NIC form-factor may removably engage. In another embodiment, RFEID 220 includes circuitry laid out on a motherboard together with local link circuitry, processor interface circuitry, other input/output circuitry, memory circuitry, storage device and peripheral controller circuitry, and the like. In another embodiment, RFEID 220 is a peripheral that interfaces with link 208 via a peripheral input/output port such as a universal serial bus (USB) port. RFEID 220 receives RF emissions over wireless transmission medium 226. RFEID 220 may be constructed to receive RADAR signaling, radio communications signaling, unintentional emissions, or some combination of such emissions.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process for detecting an anomaly on a controller area network (CAN) bus comprising:
    analyzing an arbitration field in a message on the CAN bus by determining that an arbitration identifier and a data length code are not contained on a whitelist of allowable arbitration identifier and data length code pairs;
    inspecting a data field in the message on the CAN bus;
    monitoring a frequency of message identifiers that are transmitted across the CAN bus by determining, from a specification file, a nominal frequency for the frequency of message identifiers that are transmitted across the CAN bus and a deviation from the nominal frequency wherein the deviation from the nominal frequency comprises the frequency of message identifiers being a multiple of the nominal frequency;
    determining that an overall bus load of the CAN bus crosses a threshold; and
    transmitting an alert when the analyzing the arbitration field, the inspecting the data field, the monitoring the frequency, and the determining the overall bus load indicate that the anomaly has occurred on the CAN bus.

2. The process of claim 1, wherein the inspecting the data field comprises interpreting one or more parts of the data field as signals based on one or more signal rules in a configuration file.

3. The process of claim 2, wherein the signal rules in the configuration file comprise a list of data that are allowed and a list of data that are not allowed.

4. The process of claim 1, comprising:
    determining from a table a nominal frequency for the frequency of message identifiers that are transmitted across the CAN bus; and
    generating an alarm when the frequency of message identifiers that are transmitted across the CAN bus deviates from the nominal frequency.

5. The process of claim 4, wherein the deviation from the nominal frequency comprises the frequency of message identifiers being approximately twice the—nominal frequency.

6. The process of claim 1, wherein the determining that the overall bus load crosses a threshold comprises:
    determining the threshold from a table; and
    transmitting the alert when the overall bus load is greater than the threshold.

7. The process of claim 1, wherein the inspecting the data field comprises using a decision tree further comprising allowed options for the arbitration field in the message.

8. A system comprising:
    a computer processor; and
    a computer memory coupled to the computer processor;
    wherein the computer processor is operable for detecting an anomaly on a controller area network (CAN) bus by:
        analyzing an arbitration field in a message on the CAN bus by determining that an arbitration identifier and a data length code are not contained on a whitelist of allowable arbitration identifier and data length code pairs;
        inspecting a data field in the message on the CAN bus;
        monitoring a frequency of message identifiers that are transmitted across the CAN bus by determining, from a specification file, a nominal frequency for the frequency of message identifiers that are transmitted across the CAN bus and a deviation from the nominal frequency wherein the deviation from the nominal frequency comprises the frequency of message identifiers being a multiple of the nominal frequency;

determining that an overall bus load of the CAN bus crosses a threshold; and transmitting an alert when the analyzing the arbitration field, the inspecting the data field, the monitoring the frequency, and the determining the overall bus load indicate that the anomaly has occurred on the CAN bus.

9. The system of claim 8, wherein the inspecting the data field comprises interpreting one or more parts of the data field as signals based on one or more signal rules in a configuration file.

10. The system of claim 9, wherein the signal rules in the configuration file comprise a list of data that are allowed and a list of data that are not allowed.

11. The system of claim 8, wherein the computer processor is operable for:

determining from a table a nominal frequency for the frequency of message identifiers that are transmitted across the CAN bus; and generating an alarm when the frequency of message identifiers that are transmitted across the CAN bus deviates from the nominal frequency.

12. The system of claim 11, wherein the deviation from the nominal frequency comprises the frequency of message identifiers being approximately twice the—nominal frequency.

13. The system of claim 8, wherein the determining that the overall bus load crosses a threshold comprises:

determining the threshold from a table; and transmitting the alert when the overall bus load is greater than the threshold.

14. The system of claim 8, wherein the inspecting the data field comprises using a decision tree further comprising allowed options for the arbitration field in the message.

15. A non-transitory computer-readable medium comprising instructions that when executed by a processor execute a process for detecting an anomaly on a computer network bus by:

analyzing an arbitration field in a message on the computer network bus by determining that an arbitration identifier and a data length code are not contained on a whitelist of allowable arbitration identifier and data length code pairs;

inspecting a data field in the message on the computer network;

monitoring a frequency of message identifiers that are transmitted across the computer network bus by determining, from a specification file, a nominal frequency for the frequency of message identifiers that are transmitted across the computer network bus and a deviation from the nominal frequency wherein the deviation from the nominal frequency comprises the frequency of message identifiers being a multiple of the nominal frequency;

determining that an overall bus load of the computer network bus crosses a threshold; and transmitting an alert when the analyzing the arbitration field, the inspecting the data field, the monitoring the frequency, and the determining the overall bus load indicate that the anomaly has occurred on the computer network bus.

16. The non-transitory computer-readable medium of claim 15, wherein the computer network bus comprises a controller area network (CAN) bus.

17. The non-transitory computer-readable medium of claim 15, wherein the inspecting the data field comprises interpreting one or more parts of the data field as signals based on one or more signal rules in a configuration file.

18. The non-transitory computer-readable medium of claim 15, comprising instructions for:

determining from a table a nominal frequency for the frequency of message identifiers that are transmitted across the computer network bus; and generating an alarm when the frequency of message identifiers that are transmitted across the computer network bus deviates from the nominal frequency;

wherein the deviation from the nominal frequency comprises the frequency of message identifiers being approximately twice the nominal frequency.

19. The iron-transitory computer-readable medium of claim 15, wherein the instructions for determining that the overall bus load crosses a threshold comprises instructions for:

determining the threshold from a table; and transmitting the alert when the overall bus load is greater than the threshold.

20. The non-transitory computer-readable medium of claim 15, wherein the inspecting the data field comprises using a decision tree further comprising allowed options for the arbitration field in the message.

\* \* \* \* \*